US005488981A

United States Patent [19]
Burkhart

[11] Patent Number: 5,488,981
[45] Date of Patent: Feb. 6, 1996

[54] PROTECTIVE PAD DEVICE FOR VEHICLES

[76] Inventor: Steven C. Burkhart, 9191 Enole Way, Garden Grove, Calif. 92644

[21] Appl. No.: 197,808

[22] Filed: Feb. 17, 1994

[51] Int. Cl.⁶ ..................................... B60J 11/00
[52] U.S. Cl. .................. 150/166; 296/95.1; 296/136; 297/219.11
[58] Field of Search ..................... 190/154, 166, 190/167, 168; 119/167; 296/99.5, 136; 428/156, 141; 297/195.1, 219.1, 219.11, 184.11

[56] References Cited

U.S. PATENT DOCUMENTS

| | | | |
|---|---|---|---|
| 2,057,873 | 2/1933 | Atwood | 296/97.23 X |
| 2,201,984 | 5/1940 | Clark | 150/166 X |
| 4,171,145 | 10/1979 | Pearson, Sr. | 150/167 X |
| 4,222,695 | 9/1980 | Sarides | 428/156 X |
| 4,343,848 | 8/1982 | Leonard, Jr. | 428/156 |
| 4,867,216 | 9/1989 | McKee | 150/166 |
| 4,951,993 | 8/1990 | Taboada | 150/166 X |
| 5,211,438 | 5/1993 | Snow | 296/136 X |
| 5,292,167 | 3/1994 | Hellman | 150/168 X |
| 5,333,930 | 8/1994 | Glenn | 297/219.11 |

FOREIGN PATENT DOCUMENTS

| | | | |
|---|---|---|---|
| 256010 | 2/1963 | Australia | 297/219.1 |
| 1321203 | 11/1963 | France | 296/136 |
| 127688 | 1/1902 | Germany | 297/219.11 |
| 2817516 | 10/1979 | Germany | 296/136 |
| 3243803 | 6/1984 | Germany | 296/97.23 |
| 25337 | 2/1977 | Japan | 296/136 |
| 101822 | 6/1983 | Japan | 296/136 |

Primary Examiner—Allan N. Shoap
Assistant Examiner—Christopher J. McDonald
Attorney, Agent, or Firm—Gary Appel

[57] ABSTRACT

There is disclosed an anti-cat protective or deterrent device for vehicles, the device comprising a flexible mat, which may be made of rubber, neoprene, leather, plastic or any other flexible material, having an upper surface and a lower surface, and a number of small elements attached in a closely-spaced relationship to the upper surface of the mat so as to project outwardly therefrom. Elastic cords are provided for detachably attaching the mat to a desired vehicle surface from which cats (and other small animals) are to be deterred from sleeping. The elements projecting from the mat may be in the shape of an inverted cone or a short cylinder. The elements are spaced apart from one another on the upper surface of the mat from about one-half inch to about one inch, center to center and project outwardly from said upper surface of said mat by between about one-half inch and about one inch. In an embodiment, the device is edge-contoured to fit onto a conventional motorcycle seat.

19 Claims, 3 Drawing Sheets

PROTECTIVE PAD DEVICE FOR VEHICLES

BACKGROUND OF THE INVENTION

1. Field of the Invention

The present invention relates generally to the field of protective covers for vehicles and, more particularly, to apparatus for discouraging cats and the like from sleeping on the vehicles, including automobiles and motorcycles.

2. Background Discussion

It is well known that cats have a propensity for sleeping on the warm hoods of automobiles, especially in cool or cold weather when the hoods stay warm for an extended time because of a warm engine under the hood. It is, perhaps, less well known that cats also have a propensity for sleeping on the leather or plastic seats of motorcycles, which may also be warm from the motorcycles having recently been ridden.

Although when cats sleep on the hoods of automobiles or on the seats of motorcycles they usually do not cause any permanent damage to the hoods or seats, it is very annoying to the automobile or motorcycle owner to find paw prints on the automobile or motorcycle, especially muddy paw prints- and even more especially if the muddy paw prints are made by a cat owned by someone else. Moreover, some paw prints may be accompanied by claw scratches on the hood or motorcycle seat.

It is equally well known that it is very difficult to discourage such behavior on the part of cats, since cats are basically feral animals that are completely independent and are notoriously disrespectful of property boundaries and peoples property rights. Even keeping a vehicle garaged at night is no guarantee that cat paw prints will not be found on the automobile hood or motorcycle seat of a morning.

There is understandably often a strong, natural urge on the part of the vehicle owner to cause great bodily injury to a cat found sleeping on the automobile hood or motorcycle seat- assuming the cat could be caught. However, this is not a practical option, not only because of the cruelty to the cat which is merely following its instincts, but because injury of the offending cat may cause serious neighborhood problems. In the present state of urban affairs, it is not inconceivable that an individual whose cat has been intentionally hurt by a neighbor, even though such injury may be justifiable, may settle the matter by shooting the neighbor.

There are, of course, protective automobile and motorcycle covers that at least protect the automobile paint and motorcycle seats from being muddled and/or damaged by cats'paws. Such protective covers, (exemplified in the case of motorcycles by U.S. Pat. Nos. 4,171,145 to Roger Pearson; 3,884,523 to Brian Allen and 1,853,742 to J. L. Owen, et al) do not, however, usually discourage a cat from climbing onto the covered vehicle and the covers, which may be expensive, may themselves be muddled or damaged by a cat climbing around on them.

For these and other reasons, the present applicant has invented a humane, protective pad device that can be used on the hood of an automobile or the seat of a motorcycle to prevent or at least discourage a cat from sleeping on the automobile hood or motorcycle seat without injuring the cat. After several discouraging and annoying (to the cat) attempts to jump onto the pad device, a cat may learn to avoid the automobile or motorcycle in favor of other automobiles or motorcycles not similarly protected.

SUMMARY OF THE INVENTION

In accordance with the present invention there is provided an anti-cat, deterrent pad device for vehicles, including automobiles and motorcycles. The pad device comprises a flexible mat having an upper surface and a lower surface and a number of small elements attached in a closely-spaced relationship to the upper surface of the mat so as to project outwardly therefrom and which a cat would find uncomfortable to walk or sleep on. Means are included for detachably attaching the mat to a desired vehicle surface from which cats are to be deterred from sleeping. In one instance, the elements are in the shape of an inverted cone and in another they are in the shape of a short cylinder.

Preferably, the elements are spaced apart from one another on the upper surface of the mat from about one-half inch to about one inch, center to center, and project outwardly from the upper surface of the mat by between about one-half inch and about one inch. Although the mat may be constructed from any flexible material, it is preferably constructed from rubber, neoprene, leather, plastic or fabric. In the case of a preferred embodiment, the device is edge-shaped to fit onto a conventional motorcycle seat.

The protective pad device of the present invention is easy and effective to use and is not harmful to a cat or other animal that may jump onto the pad device.

BRIEF DESCRIPTION OF THE DRAWINGS

The present invention can be more readily understood by a consideration of the following detailed description when taken in conjunction with the accompanying drawings, in which.

In the various FIGS. identical elements and features are given the same reference number.

DETAILED DESCRIPTION OF THE INVENTION

Figure 1A:
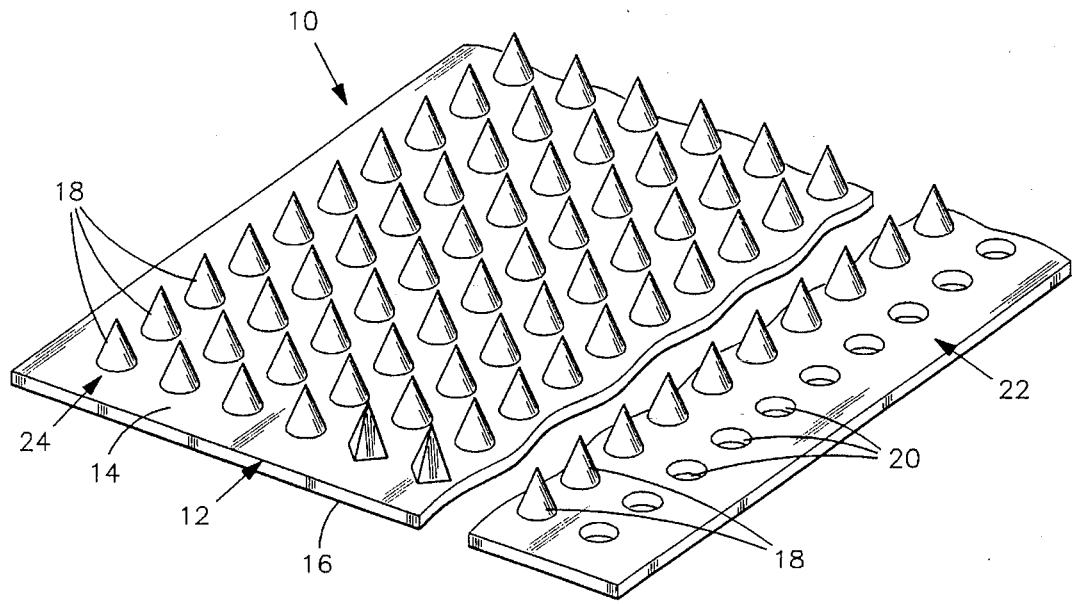
FIGS. 1A and 1B are perspective drawings showing a partial sheet of the anti-cat or other animal protective device in accordance with the present invention, FIG. 1A showing a pad having projecting from the upper surface thereof a number of closely-spaced conical projections and FIG. 1B showing a pad having projecting from an upper surface thereof a number of closely-spaced cylindrical projections.

There is shown in FIG. 1A a partial sheet 10 of an anti-cat protective pad material in accordance with one embodiment of the present invention. As described below, sheet 10 is cut to a desired shape according to its intended use. As shown in FIG. 1A, sheet 10 comprises a pad or mat 12 of a flexible material having an upper surface 14 and a lower surface 16. Fixed to upper surface 14 of pad 12 is a large number of closely-spaced apart elements 18 which project outwardly (upwardly) from such upper surface. As shown in FIG. 1A, elements 18 may be in the shape of a cone or a three-or more sided pyramid, and may be pointed (as shown) or truncated.

Figure 1B:
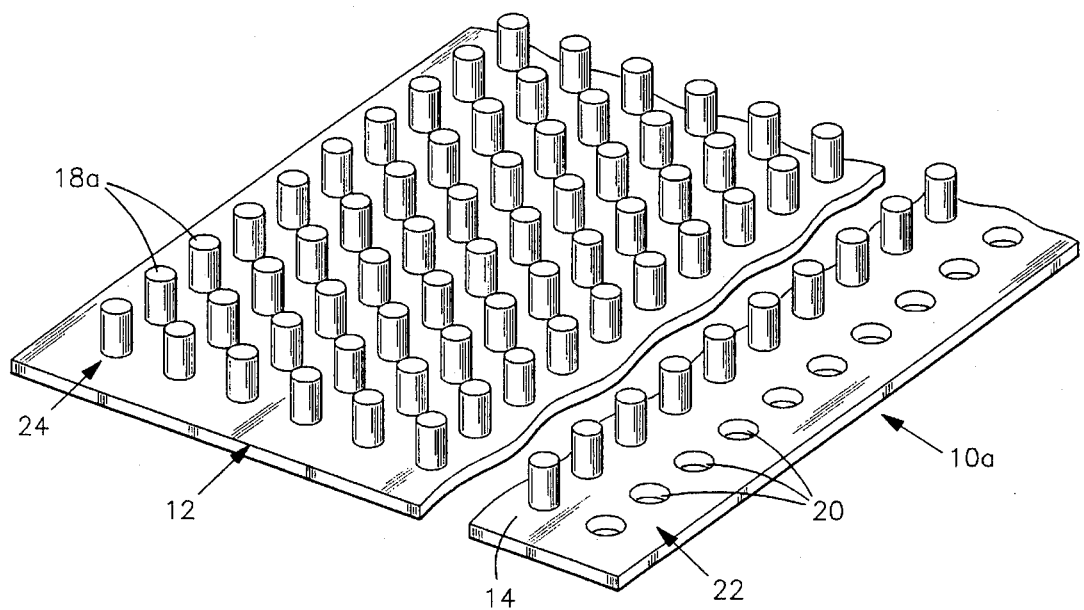

Alternatively, as shown in FIG. 1B, corresponding elements 18a of a sheet 10a may be in the shape of short, right circular cylinders. It is, of course, to be understood that the present invention is not limited to conical, pyramidal or cylindrical elements 18, 18a, and other shapes such as cubes, rectangles, and saw tooth shapes may be used.

Preferably pad 12 is constructed from some relatively soft, flexible non-slip material, such as rubber, neoprene or soft plastic. Alternatively, pad 12 may be constructed from leather or any man-made fabric and may be laminated from more than one layer of material. Pad 12 is preferably from about one-eight to about one-quarter of an inch in thickness and, although not required, is sufficiently heavy to remain in place against the action of wind and forces applied to device 10 by a cat jumping onto it.

Elements 18 and 18a are preferably constructed of a relatively hard material, such as hard rubber or plastic and are bonded to upper surface 14 of pad 12 by a suitable weather-proof cement such as a contact cement. Elements 18 and 18a are preferably mounted to pad surface 14 with a center to center spacing of between about one-half inch to about one inch and project from such upper surface by a distance of between about one-half inch and about one inch.

Depending on their overall size, sheets 10 and 10a may be constructed such that one sheet can be easily joined to another sheet to form a larger composite sheet. To this end, sheets 10 and 10a may be formed having a row of apertures 20 along one side edge region 22 (FIGS. 1A and 1B) and along another side edge region (not shown). Apertures 20 are of a size and spacing such that the apertures of one sheet 10 or 10a fit closely over an edge row 24 of corresponding elements 18 or 18a, as the case may be, of another sheet 10 or 10a.

Figure 2:
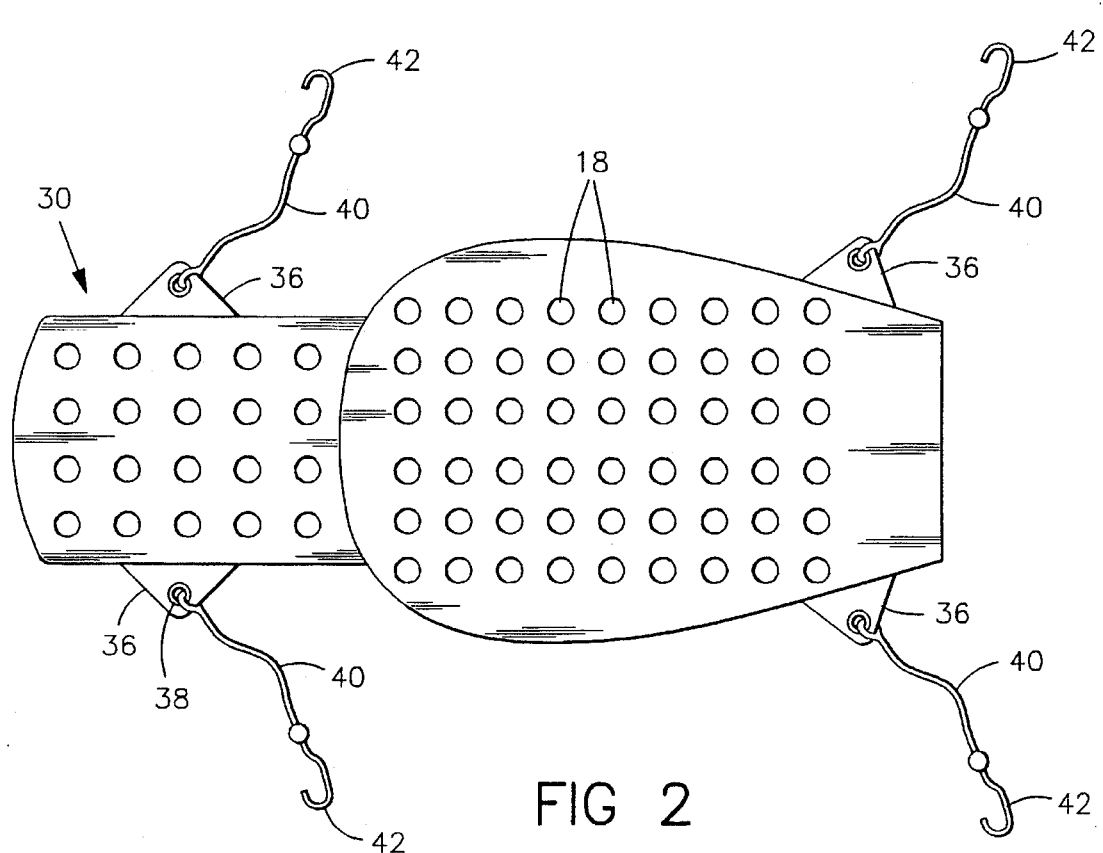
FIG. 2 is a plan view of a motorcycle seat protective cover device constructed from a sheet of material as shown in FIG. 1A.
Figure 3:
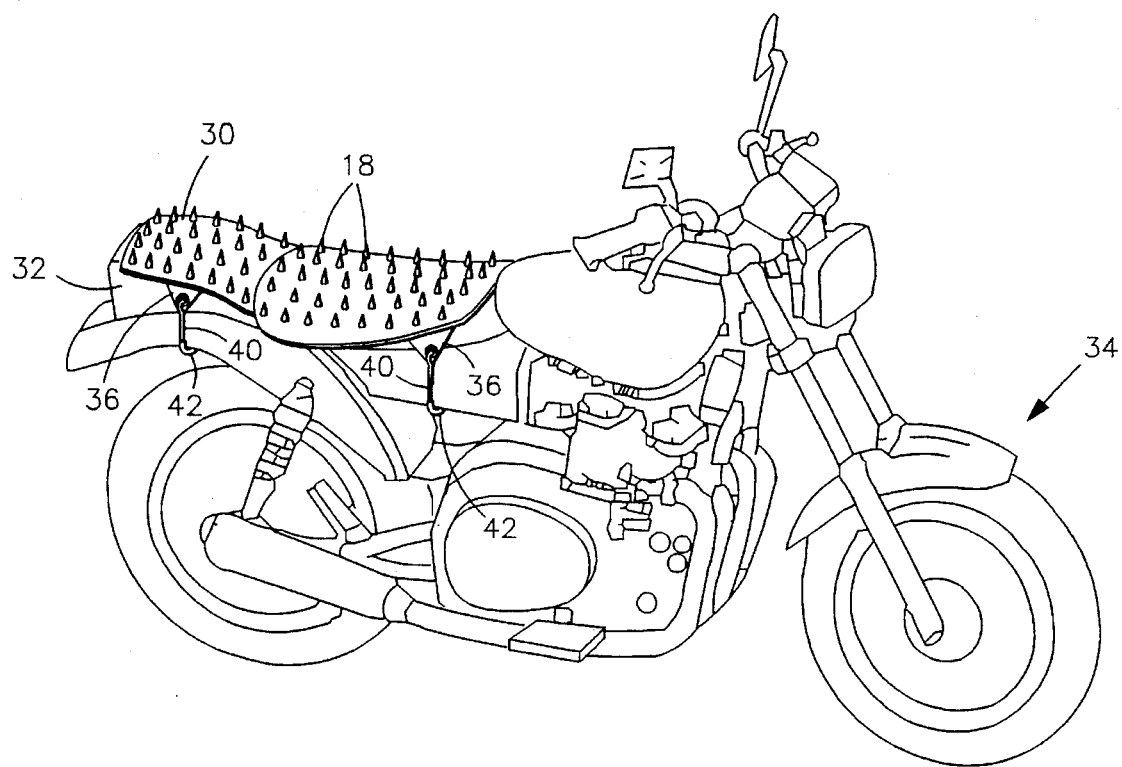
FIG. 3 is a perspective drawing of an exemplary motorcycle showing the protective cover device of FIG. 2 detachably attached to the seat thereof.

There is shown in FIGS. 2 and 3 an anti-cat, protective device 30 that is constructed from one or more sheets 10 and is edge contoured to fit onto or over a preexisting, conventional seat 32 of a representative motorcycle 34 (FIG. 3). Protective device 30 preferably includes a plurality (four being shown in FIG. 2) of flexible tie-down tabs 36 each having a metal grommeted aperture 38. Tabs 36 are preferably located near corner regions of device 30.

Shown hooked into each aperture 38 is an elastic tie-down cord 40, such as a conventional bungee cord, having a tie-down hook 42 at its free end.

Figure 4:
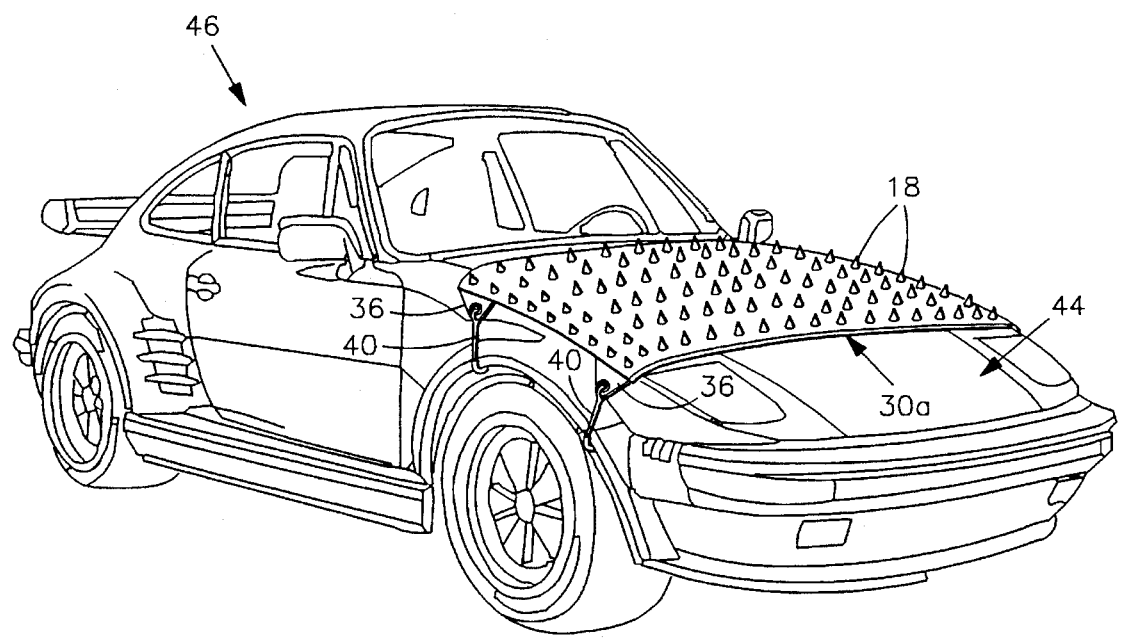
FIG. 4 is a perspective drawing of an exemplary automobile showing a protective cover device constructed of the material of FIG. 1A covering hood portions thereof.

FIG. 4 illustrates a differently shaped anti-cat protective device 30a that is similar to above-described device 30 for motorcycle 34, except that device 30a is sized and shaped for placement onto a hood 44 of a representative automobile 46. Elastic tie-down cords 40, hooked into apertures 38 of tie-down tabs 36, are preferably used to detach ably secure device 30a to hood 44.

Protective pad devices 30 and 30a as described above are merely representative of the types of protective devices that may be constructed from sheets 10 and 10a or which may be custom made in the manner of making such sheets. Devices 30 and 30a are relatively inexpensive to make and are considered by the present inventor to be effective in deterring cats (and other small animals) from jumping onto regions of vehicles covered by the devices without causing any injury to the cat (or other animals).

Although there have been described and illustrated anti-cat protective devices for motorcycle seats, automobile hoods or the like in accordance with the present invention for purposes of illustrating the manner in which the invention may be used to advantage, it is to be appreciated that the invention is not limited thereto. Therefore, any and all variations and modifications that may occur to those skilled in the appropriate art are to be considered as being within the scope and spirit of the claims as appended hereto.

What is claimed is:

1. An animal deterrent apparatus for discouraging cats and other small animals from reclining or walking on the surface of a vehicle, said apparatus comprising:

a flexible mat having within an enclosed periphery a generally non-slip lower surface and an upper surface defining a first plurality of firm or hard discrete repelling elements projecting upwardly in a closely spaced mutual relationship therefrom, said repelling elements having shapes selected from cones, pyramids, cylinders or combinations thereof; and a second plurality of flexible tie-town tabs disposed adjacent to an edge portion of said periphery, each said tab having a grommeted aperture.

2. The apparatus of claim 1 further comprising at least one tie-down elastic cord secured to each said grommeted aperture, each said cord having a tie-down hook affixed to a free end thereof for detachably securing said cord to said vehicle.

3. The apparatus of claim 1 wherein said repelling elements are arranged in rows and columns, each said element being separated from an adjacent element in said row or column by a distance in the range of one-half inch to one inch, center to center.

4. The apparatus of claim 1 wherein said repelling elements project approximately one-half inch to one inch from said upper surface of said mat.

5. The apparatus of claim 1 wherein said flexible mat is comprised of material taken from the group consisting of rubber, neoprene, leather, plastic and fabric.

6. The apparatus of claim 1 wherein said vehicle comprises a motorcycle and said portion of said vehicle surface includes the surface of an external seat of said motorcycle.

7. The apparatus of claim 1 wherein said vehicle comprises an automobile and said portion of said vehicle surface includes any generally horizontal upper external surface of said automobile.

8. An animal deterrent apparatus for discouraging cats and other small animals from reclining or walking on the surface of a vehicle, said apparatus comprising:

a flexible mat having within an enclosed periphery a generally non-slip lower surface and an upper surface defining a first plurality of firm or hard discrete repelling elements projecting upwardly in a closely spaced mutual relationship therefrom; a second plurality of flexible tie-town tabs disposed adjacent to an edge portion of said periphery, each of said tab having a grommeted aperture;

a second plurality of flexible tie-town tabs disposed adjacent to an edge portion of said periphery, each said tab having a grommeted aperture; and an extension mat constructed essentially identical in material to said flexible mat, said extension mat having at least one row of linking apertures disposed along a peripheral side edge region thereof, said linking apertures being arranged to conform in size and spacing to the configuration of those ones of said repelling elements that are disposed along a peripheral side edge region of said flexible mat, thereby facilitating engagement of said extension mat linking apertures with said flexible mat edge region repelling elements to form an extended mat arrangement.

9. An animal deterrent apparatus for discouraging cats and other small animals from reclining or walking on the surface of a vehicle, said apparatus comprising:

a flexible mat having a peripheral edge formed in the shape of said vehicle surface, and having within said peripheral edge a non-slip lower surface and an upper surface defining a first plurality of discrete repelling elements projecting upwardly in a mutually closely spaced relationship therefrom, said repelling elements having shapes selected from cones, pyramids, cylinders or combinations thereof;

a second plurality of flexible tie-town tabs disposed adjacent to said mat peripheral, each said tab having a grommeted aperture; and at least one tie-down elastic cord secured to each said grommeted aperture, each said cord having a tie-down hook affixed to a free end thereof for detachably securing said cord to said vehicle.

10. The apparatus of claim 9 wherein said repelling elements are arranged in rows and columns, each said element being separated from an adjacent element in said row or column by a distance in the range of one-half inch to one inch.

11. The apparatus of claim 9 wherein said repelling elements project approximately one-half inch to one inch from said upper surface of said mat.

12. The apparatus of claim 9 wherein said flexible mat is comprised of material taken from the group consisting of rubber, neoprene, leather, plastic and fabric.

13. The apparatus of claim 9 wherein said vehicle comprises a motorcycle and said portion of said vehicle surface includes the surface of an external seat of said motorcycle.

14. The apparatus of claim 9 wherein said vehicle comprises and automobile and said portion of said vehicle surface includes any generally horizontal upper external surface of said automobile.

15. An animal deterrent apparatus for discouraging cats and other small animals from reclining or walking on the surface of a vehicle said apparatus comprising:

a flexible mat having a peripheral edge formed in the shape of said vehicle surface, and having within said peripheral edge a non-slip lower surface and an upper surface defining a first plurality of discrete repelling elements projecting upwardly in a mutually closely spaced relationship therefrom;

a second plurality of flexible tie-town tabs disposed adjacent to said mat peripheral, each said tab having a grommeted aperture;

at least one tie-down elastic cord secured to each said grommeted aperture, each said cord having a tie-down hook affixed to a free end thereof for detachably securing said cord to said vehicle; and an extension mat constructed essentially identical in material to said flexible mat, said extension mat having at least one row of linking apertures disposed along a peripheral side edge region thereof, said linking apertures being arranged to conform in size and spacing to the configuration of those ones of said repelling elements that are disposed along a peripheral side edge region of said flexible mat, thereby facilitating engagement of said extension mat linking apertures with said flexible mat edge region repelling elements to form an extended mat arrangement.

16. A method for discouraging cats and other small animals from reclining or walking on the surface of a vehicle, said method comprising the steps of:

providing a flexible mat having a non-slip lower surface and an upper surface defining a first plurality of discrete repelling elements projecting upwardly in a closely spaced mutual relationship therefrom, and having a second plurality of grommeted tie-town tabs, each said tab having a grommeted aperture; and providing at least one elastic tie-down cord secured to each said grommeted aperture, each said cord having a tie-down hook at a free end thereof;

draping said flexible mat over a portion of said vehicle surface so that said lower mat surface is disposed adjacent to said vehicle surface;

attaching each said tie-down hook to said vehicle, thereby securing said mat in place;

providing an extension mat constructed essentially identical to said flexible mat said extension mat having at least one row of linking apertures disposed along a peripheral side edge region thereof, said linking apertures being arranged to conform in size and spacing to the configuration of those ones of repelling elements that are disposed along a peripheral side edge region of said flexible mat; and joining said flexible mat with said extension mat by engaging said row of linking apertures to said repelling elements disposed along said flexible mat side edge region.

17. The method of claim 16 further comprising the steps of:

providing an extension mat constructed essentially identical to said flexible mat, said extension mat having at least one row of linking apertures disposed along a peripheral side edge region thereof, said linking apertures being arranged to conform in size and spacing to the configuration of those ones of said repelling elements that are disposed along a peripheral side edge region of said flexible mat; and joining said flexible mat with said extension mat by engaging said row of linking apertures to said repelling elements disposed along said flexible mat side edge region.

18. The method of claim 16 wherein said vehicle comprises a motorcycle and said portion of said vehicle surface includes the surface of an external seat of said motorcycle.

19. The method of claim 16 wherein said vehicle comprises an automobile and said portion of said vehicle surface includes any generally horizontal upper external upper external surface of said automobile.

* * * * *